US009573459B2

United States Patent
Shimomura

(10) Patent No.: US 9,573,459 B2
(45) Date of Patent: Feb. 21, 2017

(54) EXHAUST PIPE COVER STRUCTURE FOR SADDLE-RIDE TYPE VEHICLE

(71) Applicant: HONDA MOTOR CO., LTD., Tokyo (JP)

(72) Inventor: Nobuyuki Shimomura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 78 days.

(21) Appl. No.: 14/066,323

(22) Filed: Oct. 29, 2013

(65) Prior Publication Data

US 2014/0174581 A1 Jun. 26, 2014

(30) Foreign Application Priority Data

Dec. 26, 2012 (JP) .................................. 2012-282515

(51) Int. Cl.
| | | |
|---|---|---|
| *F16L 3/00* | (2006.01) | |
| *F16L 57/00* | (2006.01) | |
| *B60K 13/04* | (2006.01) | |
| *B62K 11/04* | (2006.01) | |

(52) U.S. Cl.
CPC ............ *B60K 13/04* (2013.01); *B60Y 2200/12* (2013.01); *B62K 11/04* (2013.01)

(58) Field of Classification Search
CPC ..................................................... B60K 13/04
USPC ................................................. 138/106, 110
See application file for complete search history.

(56) References Cited

U.S. PATENT DOCUMENTS

| | | | | |
|---|---|---|---|---|
| 3,863,445 | A * | 2/1975 | Heath ............................. | 60/299 |
| 5,464,952 | A * | 11/1995 | Shah et al. .................... | 181/211 |
| 5,844,177 | A * | 12/1998 | Pirchl ..................... | B60R 13/08 |
| | | | | 180/89.2 |
| 6,328,513 | B1 * | 12/2001 | Niwa ................... | G10K 11/168 |
| | | | | 16/2.1 |
| 6,438,949 | B1 * | 8/2002 | Nozaki .......................... | 60/322 |
| 6,561,312 | B2 * | 5/2003 | Stanienda ............ | F16B 5/0241 |
| | | | | 180/300 |
| 6,702,062 | B2 * | 3/2004 | Kusabiraki ............ | F01N 13/08 |
| | | | | 181/212 |
| 7,065,963 | B2 * | 6/2006 | Niwa .................. | B60R 13/0876 |
| | | | | 165/72 |

(Continued)

FOREIGN PATENT DOCUMENTS

| | | |
|---|---|---|
| JP | 53-007645 A | 7/1976 |
| JP | 56-106214 A | 1/1980 |

(Continued)

*Primary Examiner* — Paul R Durand
*Assistant Examiner* — Vishal Pancholi
(74) *Attorney, Agent, or Firm* — Westerman, Hattori, Daniels & Adrian, LLP

(57) ABSTRACT

An exhaust pipe cover structure for a saddle-ride type vehicle allows an exhaust pipe cover to be easily positioned and attached even in the case of attaching the exhaust pipe cover to an exhaust pipe attached to an engine. Boss portions each having an internal thread through which an exhaust pipe cover is fastened are provided on a lateral surface of an exhaust pipe. Hooking holes capable of being hooked on the boss portions with play are integrally provided on the inner side of the exhaust pipe cover. In a state where the hooking portions are hooked on the boss portions, part of the boss portions is viewable through attaching holes of the exhaust pipe cover.

14 Claims, 11 Drawing Sheets

(56) References Cited

U.S. PATENT DOCUMENTS

| | | | |
|---|---|---|---|
| 7,162,868 B2* | 1/2007 | Funakoshi | F01N 3/08 |
| | | | 165/52 |
| 7,401,463 B2* | 7/2008 | Tsuruta | 60/320 |
| 7,946,380 B2* | 5/2011 | Yamamoto et al. | 181/227 |
| 8,104,573 B2* | 1/2012 | Oxenknecht | B60R 13/0876 |
| | | | 181/200 |
| 8,186,325 B2* | 5/2012 | Upton et al. | 123/195 E |
| 2005/0076966 A1* | 4/2005 | Ackermann et al. | 138/110 |
| 2005/0140075 A1* | 6/2005 | Mishima | 267/140.11 |

FOREIGN PATENT DOCUMENTS

| | | |
|---|---|---|
| JP | 60-061430 A | 4/1985 |
| JP | 61-005319 A | 1/1986 |
| JP | 2-044106 A | 3/1990 |
| JP | 2001-54663 A | 2/2001 |
| JP | 2003-041933 A | 2/2003 |

* cited by examiner

EXHAUST PIPE COVER STRUCTURE FOR SADDLE-RIDE TYPE VEHICLE

CROSS-REFERENCE TO RELATED APPLICATIONS

The present application claims priority under 35 U.S.C. §119 to Japanese Patent Application No. 2012-282515, filed Dec. 26, 2012, the contents of which is incorporated herein, by reference, in its entirety.

TECHNICAL FIELD

The present invention relates to an exhaust pipe cover structure for a saddle-ride type vehicle including an exhaust pipe cover which covers a lateral side of an exhaust pipe and is fastened to the exhaust pipe.

BACKGROUND OF THE INVENTION

A structure for a saddle-ride type vehicle such as a motorcycle has been disclosed which includes an exhaust pipe cover that covers a lateral side of an exhaust pipe and is fastened to the exhaust pipe (see Japanese Patent Application Publication No. 2003-041933, for example). In the case of the conventional structure, the exhaust pipe cover can be sub-assembled to a lateral side of a portion of the exhaust pipe, the portion extending in the front-rear direction.

The sub-assembling involves operations of: holding the exhaust pipe cover against the exhaust pipe being one separate body; aligning bolt inserting holes of the exhaust pipe cover and bolt fastening holes of the exhaust pipe; and fastening bolts.

SUMMARY OF THE INVENTION

Meanwhile, the conventional exhaust pipe cover is a small cover that covers only a lowermost portion of the exhaust pipe and is not a cover that extends to the exhaust port of the engine.

The exhaust pipe cover is desired to be extended to the vicinity of the exhaust port of the engine in some cases depending upon the need for the vehicle. In these cases, it is possible to select a method which involves attaching the exhaust pipe cover to the exhaust pipe after attaching the exhaust pipe to the engine, instead of sub-assembling the exhaust pipe cover to the exhaust pipe, in consideration of the use of nuts and tools at the time of mounting the exhaust pipe to the exhaust port.

However, attaching the exhaust pipe cover in a complete vehicle line requires holding the exhaust pipe cover against the exhaust pipe connected to the engine, and aligning the bolt inserting holes of the exhaust pipe cover and the bolt fastening holes of the exhaust pipe. This leads to a problem of making the mounting work difficult. In addition, extending the exhaust pipe cover to the exhaust port of the engine makes the cover long, which also makes the mounting work difficult.

An exhaust pipe cover structure for a saddle-ride type vehicle allows an exhaust pipe cover to be easily positioned and attached even in the case of attaching the exhaust pipe cover to an exhaust pipe attached to an engine.

An exhaust pipe cover structure for a saddle-ride type vehicle includes an exhaust pipe which is connected to an exhaust port of an engine, and an exhaust pipe cover which covers a lateral side of the exhaust pipe and is fastened to the exhaust pipe, wherein a boss portion having an internal thread through which the exhaust pipe cover is fastened is provided on a lateral surface of the exhaust pipe, a hooking portion capable of being hooked on the boss portion is integrally provided on an inner side of the exhaust pipe cover, and in a state where the hooking portion is hooked on the boss portion, part of the boss portion is viewable through an attaching hole of the exhaust pipe cover.

According to this configuration, even in the case of attaching the exhaust pipe cover to the exhaust pipe attached to the engine, the assembler can visually recognize the position of the boss portion through the attaching hole of the exhaust pipe cover. Accordingly, the exhaust pipe cover can be positioned and attached easily.

In the above configuration, the hooking portion may be hooked on the boss portion with play. According to this configuration, the hooking portion can be easily hooked on the boss portion, and the position of the exhaust pipe cover in the hooked state can be easily adjusted.

Moreover, in the above configuration, the hooking portion may have an upwardly bulging arch-shaped guide which comes into contact with the boss portion to restrict a moving range of the exhaust piece cover. According, to this configuration, it is possible to narrow the moving range of the exhaust pipe cover in the up-down direction while securing the moving range thereof in the front-rear direction.

Moreover, in the above configuration, the hooking portion may be formed as a substantially elliptical loose penetration hole which allows the boss portion to loosely penetrate therethrough. According to this configuration, it is possible, with a simple shape, to secure a wide moving range for the exhaust pipe cover in the direction of the longer axis of the loose penetration hole and narrow the moving range in the direction of the shorter axis.

Moreover, in the above configuration, a plate-shaped piece may be provided to the exhaust pipe cover, and the hooking portion may be provided to the plate-shaped piece. According to this configuration, the rigidity of the exhaust pipe cover can be increased by the plate-shaped piece.

Moreover, in the above configuration, the hooking portion of the plate-shaped piece may be disposed at a position separated from the exhaust pipe cover. According to this configuration, the hooking portion can be hooked on the boss portion to a certain depth. Accordingly, the hooking portion can be hooked easily.

Moreover, in the above configuration, the exhaust pipe cover may extend to the vicinity of the exhaust port of the engine, and the exhaust pipe may include a catalyst at a position downstream of the exhaust pipe cover. According to this configuration, the exhaust pipe cover can suppress decrease in the temperature of exhaust gas reaching the catalyst and thus facilitate faster activation of the catalyst.

Moreover, in the above configuration, in a state where the hooking portion is hooked on the boss portion, part of the internal thread provided in the boss portion may be viewable through the attaching hole of the exhaust pipe cover. According to this configuration, it is possible to visually recognize the position of the internal thread, provided in the boss portion, through the attaching hole of the exhaust pipe cover. Accordingly, the exhaust pipe cover can be positioned and attached easily.

The boss portion having the internal thread through which the exhaust pipe cover that covers the lateral side of the exhaust pipe is fastened is provided on the lateral surface of the exhaust pipe; the hooking portion capable of being hooked on the boss portion is integrally provided on the inner side of the exhaust pipe cover; and in the state where the hooking portion is hooked on the boss portion, part of the boss portion is viewable through the attaching hole of the exhaust pipe cover. Accordingly, the exhaust pipe cover can be positioned and attached easily even in the case of attaching the exhaust pipe cover to the exhaust pipe attached to the engine.

Moreover, by hooking the hooking portion on the boss portion with a play the hooking portion can be easily hooked on the boss portion, and the position of the exhaust pipe cover in the hooked state can be easily adjusted.

Moreover, by providing the hooking portion with the upwardly bulging arch-shaped guide which comes into contact with the boss portion to restrict the moving range of the exhaust piece cover, it is possible to narrow the moving range of the exhaust pipe cover in the up-down direction while securing the moving range thereof in the front-rear direction.

Moreover, by forming the hooking portion as the substantially elliptical loose penetration hole which allows the boss portion to loosely penetrate therethrough, it is possible, with a simple shape, to secure a wide moving range for the exhaust pipe cover in the direction of the longer axis of the loose penetration hole and narrow the moving range in the direction of the shorter axis.

Moreover, by providing the plate-shaped piece to the exhaust pipe cover and providing the hooking portion to the plate-shaped piece, the rigidity of the exhaust pipe cover can be increased by the plate-shaped piece.

Moreover, by disposing the hooking portion of the plate-shaped piece at a position separated from the exhaust pipe cover, the hooking portion can be hooked on the boss portion to a certain depth. Accordingly, the hooking portion can be hooked easily.

Moreover, by extending the exhaust pipe cover to the vicinity of the exhaust port of the engine, and providing the exhaust pipe with a catalyst at a position downstream of the exhaust pipe cover, the exhaust pipe cover can suppress decrease in the temperature of exhaust gas reaching the catalyst and thus facilitate faster activation of the catalyst.

Moreover, by making part of the internal thread, provided in the boss portion, viewable through the attaching hole of the exhaust pipe cover in the state where the hooking portion is hooked on the boss portion, it is possible to visually recognize the position of the internal thread, provided in the boss portion, through the attaching hole of the exhaust pipe cover. Accordingly, the exhaust pipe cover can be positioned and attached easily.

BRIEF DESCRIPTION OF THE DRAWINGS

The advantages of the invention will become apparent in the following description taken in conjunction with the drawings, wherein.

DETAILED DESCRIPTION OF THE INVENTION

Figure 1:
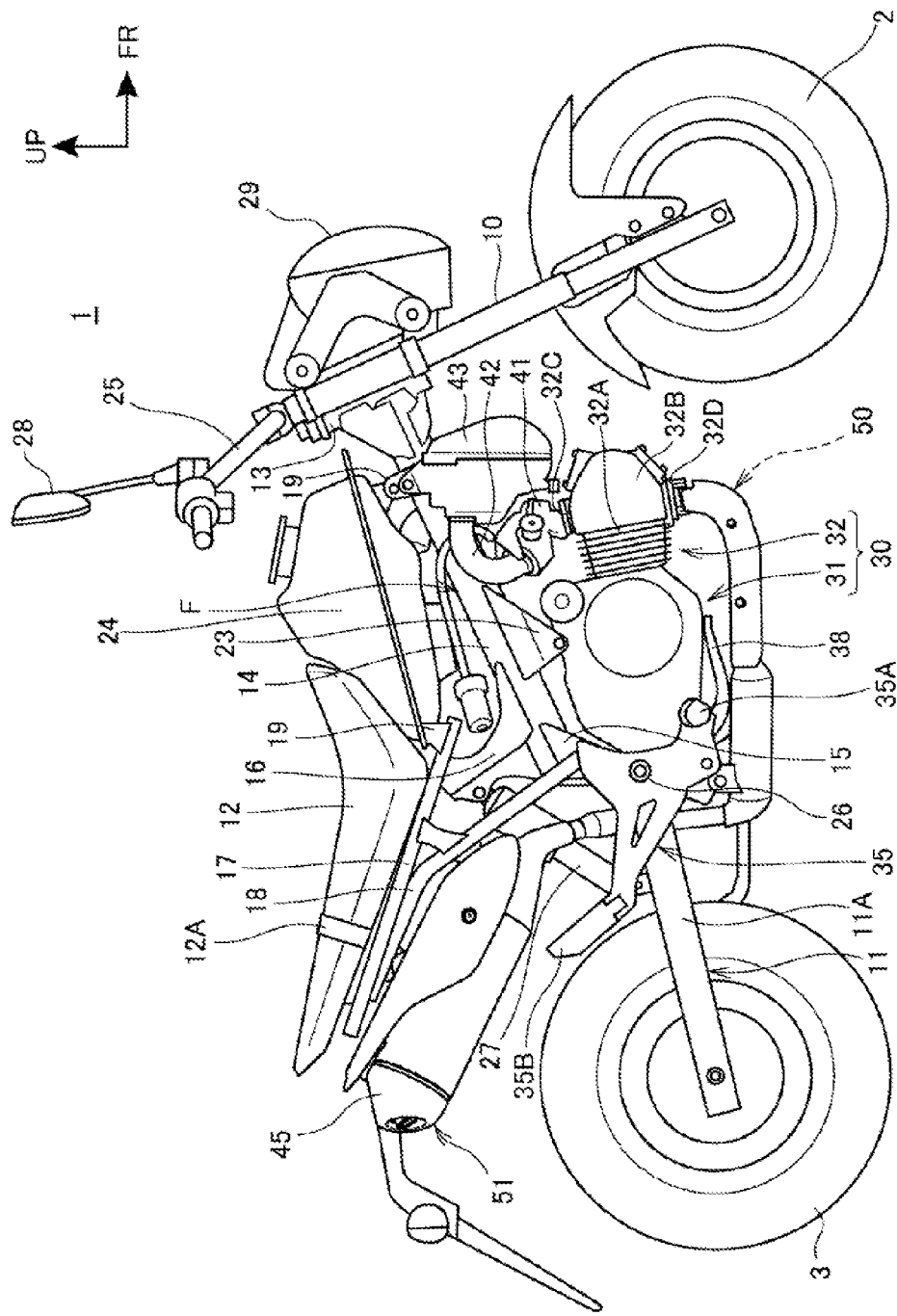
FIG. 1 is a right-side view of a motorcycle according to an embodiment.

Hereinbelow, an embodiment of the present invention will be described with reference to the drawings. Note that directions such as front, rear, left, right, up, and down to be mentioned in the description should be considered to be identical to the directions based on the vehicle body unless otherwise noted. Moreover, reference numerals FR, UP, and RT shown in drawings denote the front side of the vehicle body, the upper side of the vehicle body, and the right side of the vehicle body, respectively.

FIG. 1 is a right-side view of a motorcycle according to an embodiment of the present invention.

As shown in FIG. 1, a motorcycle 1 is a saddle-ride type vehicle in which: a front wheel 2 is supported on a front portion of a vehicle body frame F through a front fork. 10; a rear wheel 3 is supported on a rear portion of the vehicle body frame F through a swingarm 11; an engine 30 is supported at the center of the vehicle body frame F in the front-rear direction; and a seat 12 for an occupant to straddle is provided above the vehicle body frame F.

The vehicle body frame F includes: a head pipe 13 provided at the front end; and a single main frame 14 extending rearward from the head pipe 13 while inclining obliquely downward. A pair of left and right center frames 15 extending leftward and rightward and then extending downward are provided on a rear portion of the main frame 14. A pair of left and right suspension brackets 16 extending upwardly rearward are provided there as well.

A seat frame 17 which supports the seat 12 is joined to the upper ends of the suspension brackets 16. The seat frame 17 extends upwardly rearward and is joined, at its middle portion in the front-rear direction, to a sub frame 18 extending upwardly rearward from the center frames 15. The main frame 14 and the center frames 15 support load from the seat 12.

The seat 12 is a tandem seat designed such that the rider sits on a front area and a passenger sits on a rear area. A seat band 12A which the passenger grips is provided in front of the area on the seat 12 where the passenger sits.

The front fork 10 is supported on the head pipe 13 through a steering shaft, which is not shown, steerably to the left and right. The front wheel 2 is supported on a lower portion of the front fork 10. Moreover, a steering handlebar 25 which the rider grips is provided on an upper portion of the front fork 10. Side mirrors 28 and the like are supported on the handlebar 25.

Moreover, a headlight unit 29 is also supported on the head pipe 13.

Tank stays 19 are provided on a front portion of the main frame 14 and a front portion of the seat frame 17. A fuel tank 24 is supported on the front upper side of the main frame 14 in front of the seat 12 through these tank stays 19.

An engine hanger 23 is attached to a middle portion of the main frame 14 in the front-rear direction, and the engine 30 is supported below the main frame 14 through this engine hanger 23. Moreover, a rear portion of the engine 30 is supported on the pair of left and right center frames 15. Thus, the engine 30 is supported in a space formed below the main frame 14 and in front of the center frames 15.

Moreover, a front end portion of the swingarm 11 is pivotally supported on the pair of left and right center frames 15 through a pivot shaft 26. The swingarm 11 includes a pair of left and right arm portions 11A extending in the front-rear direction of the vehicle body. The rear wheel 3 is rotatably supported on the rear ends of these arm portions 11A. The lower end of a rear cushion unit 27 is joined to the swingarm 11 between the rear wheel 3 and the center frames 15. The upper end of the rear cushion unit 27 is joined to the suspension brackets 16 of the vehicle body frame F.

A pair of left and right step stays 35 are attached to the outer sides of the pair of left and right center frames 15 in the vehicle width direction. The pair of left and right step stays 35 includes: a pair of left and right rider steps 35A for the rider to place his or her feet; and a pair of left and right passenger steps 35B for the passenger to place his or her feet. A brake pedal 38 for braking operations is provided in the vicinity of the light rider step 35A. A shift pedal (not shown) for gearshift operations is provided in the vicinity of the left rider step 35A. As for the drive method of this motorcycle 1, a chain drive method is employed in which the drive force of the engine 30 is transmitted to the rear wheel 3 via a chain transmission mechanism (not shown).

The engine 30 is, for example, an air-cooled single-cylinder four-stroke engine and includes a crankcase 31 and a cylinder unit 32 (a cylinder block 32A, a cylinder head 32B, etc.) joined to a front portion of the crankcase 31. As shown in FIG. 1, this engine 30 is a horizontal engine inclined forward to such an extent that the cylinder unit 32 is almost horizontal. Employing a horizontal engine is advantageous in optimizing the center of gravity such as lowering the center of gravity of the vehicle body, and also allows the engine 30 to be mounted on a vehicle body having a small empty space in the vertical direction.

An intake port 32C as the air inlet of the engine 30 is bored in the upper surface of the cylinder unit 32 (the upper surface of the cylinder head 32B). An exhaust port 32D as the air outlet of the engine 30 is bored in the lower surface of the cylinder unit 32 (the lower surface of the cylinder head 32B).

A throttle body 41 is joined to the intake port 32C, and an air cleaner box 43 is connected to the upstream end of this throttle body 41 by a connecting tube 42. The throttle body 41, the connecting tube 12, and the air cleaner box 43 constitute the intake system of the engine 30. An exhaust pipe 50 is connected to the exhaust port 32D, and an exhaust muffler 51 is connected to the downstream end of this exhaust pipe 50.

Figure 2:
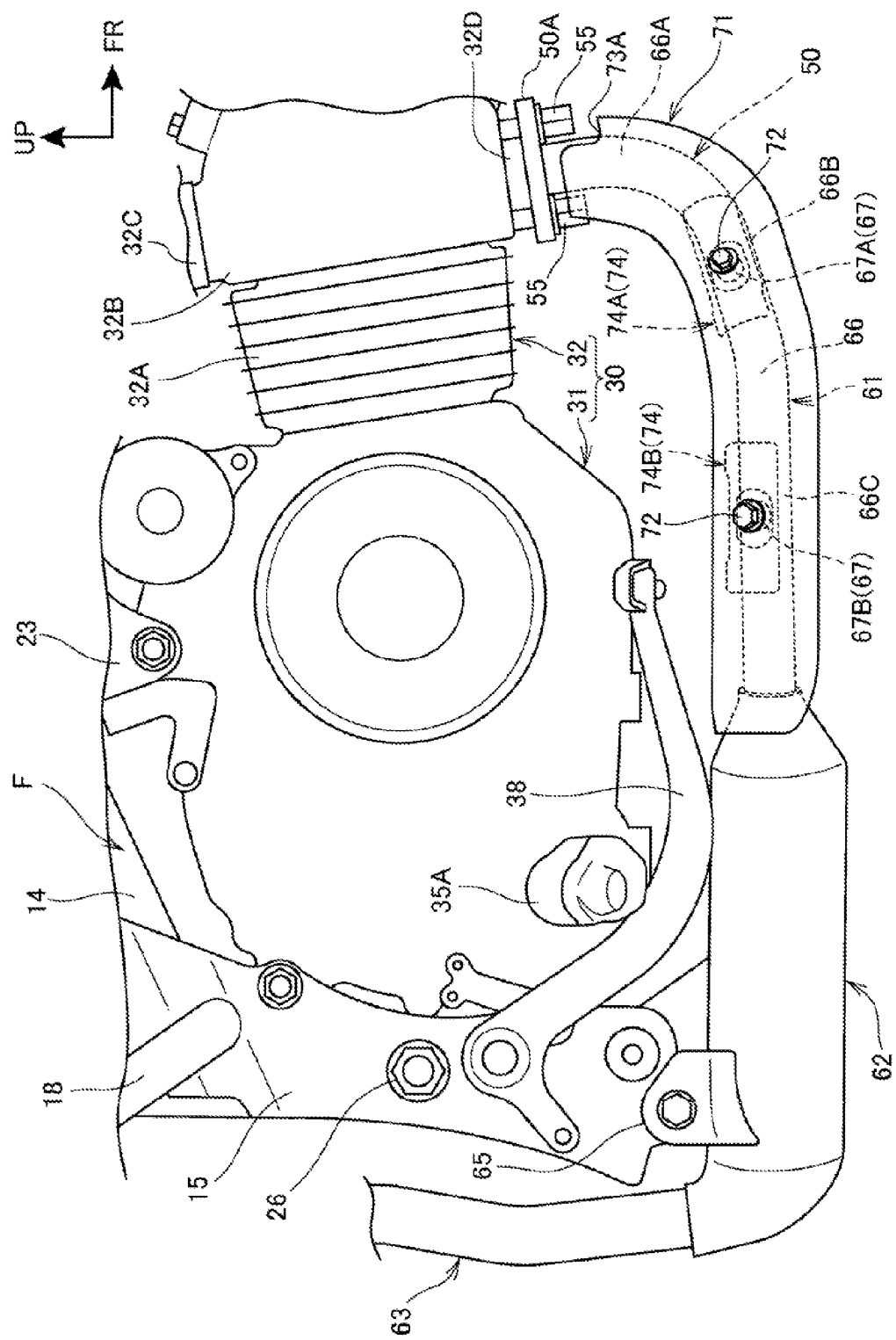
FIG. 2 is a view of an exhaust pipe together with its peripheral configuration as seen from the right of the vehicle body.

FIG. 2 is a view of the exhaust pipe 50 together with its peripheral configuration as seen from the right of the vehicle body.

The exhaust pipe 50 has a flange portion 50A at its front end (upstream end) and is fastened to the engine 30 by fastening this flange portion 50A to the cylinder head 32B with multiple fastening bolts (fastening members) 55.

The exhaust pipe 50 extends downward from the exhaust port 32D of the engine 30, bends rearward in front of and below the crankcase 31, passes under the crankcase 31, bends upward behind the center frames 15, and connects to the exhaust muffler 51 behind and above the center frames 15.

To this exhaust pipe 50, a relatively long exhaust pipe cover 71 is attached which covers a lateral side of the exhaust pipe 50 and extends to the vicinity of the exhaust port of the engine 30.

Since the exhaust pipe cover 71 of this configuration extends to the vicinity of the exhaust port 32D of the engine 30, it is difficult to employ a method which involves sub-assembling the exhaust pipe cover 71 to the exhaust pipe 50, in view of securing a space for inserting the fastening bolts 55 at the time of attaching the exhaust pipe 50 to the exhaust port 32D as well as a space for a tool for fastening the bolts. For this reason, the exhaust pipe cover 71 is attached after attaching the exhaust pipe 50 to the engine 30.

The employed attaching method requires the exhaust pipe cover 71 to be positioned and attached within a small space around the engine 30. This work is difficult especially because the exhaust pipe cover 71 extends to the vicinity of the exhaust port 32D of the engine 30.

In this respect, this embodiment employs an exhaust pipe cover structure that makes the attaching work easier. Hereinbelow, an exhaust pipe structure including the exhaust pipe cover 71 will be described.

Figure 3:
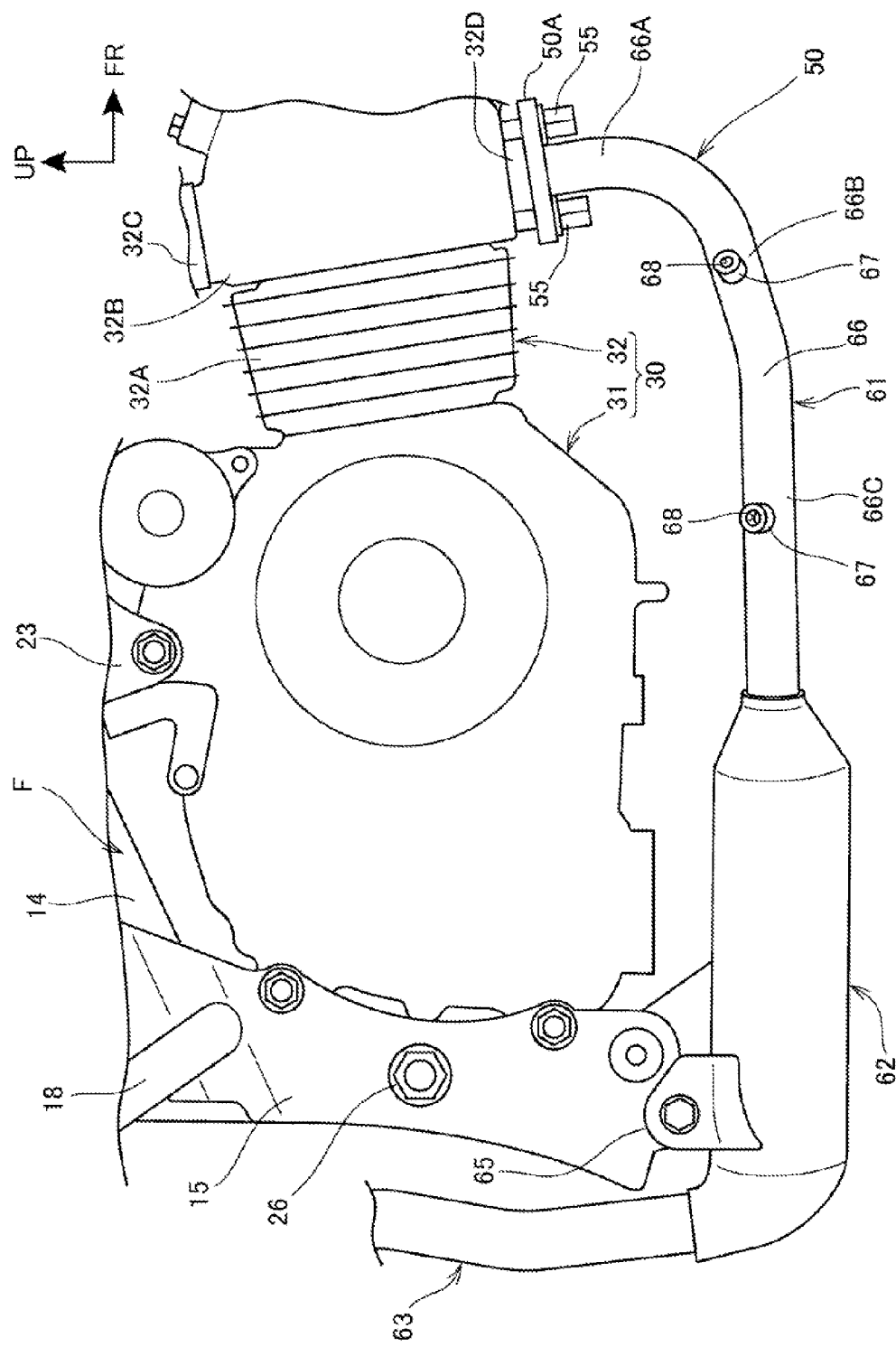
FIG. 3 is a view with an exhaust pipe cover removed from FIG. 2.
Figure 4:
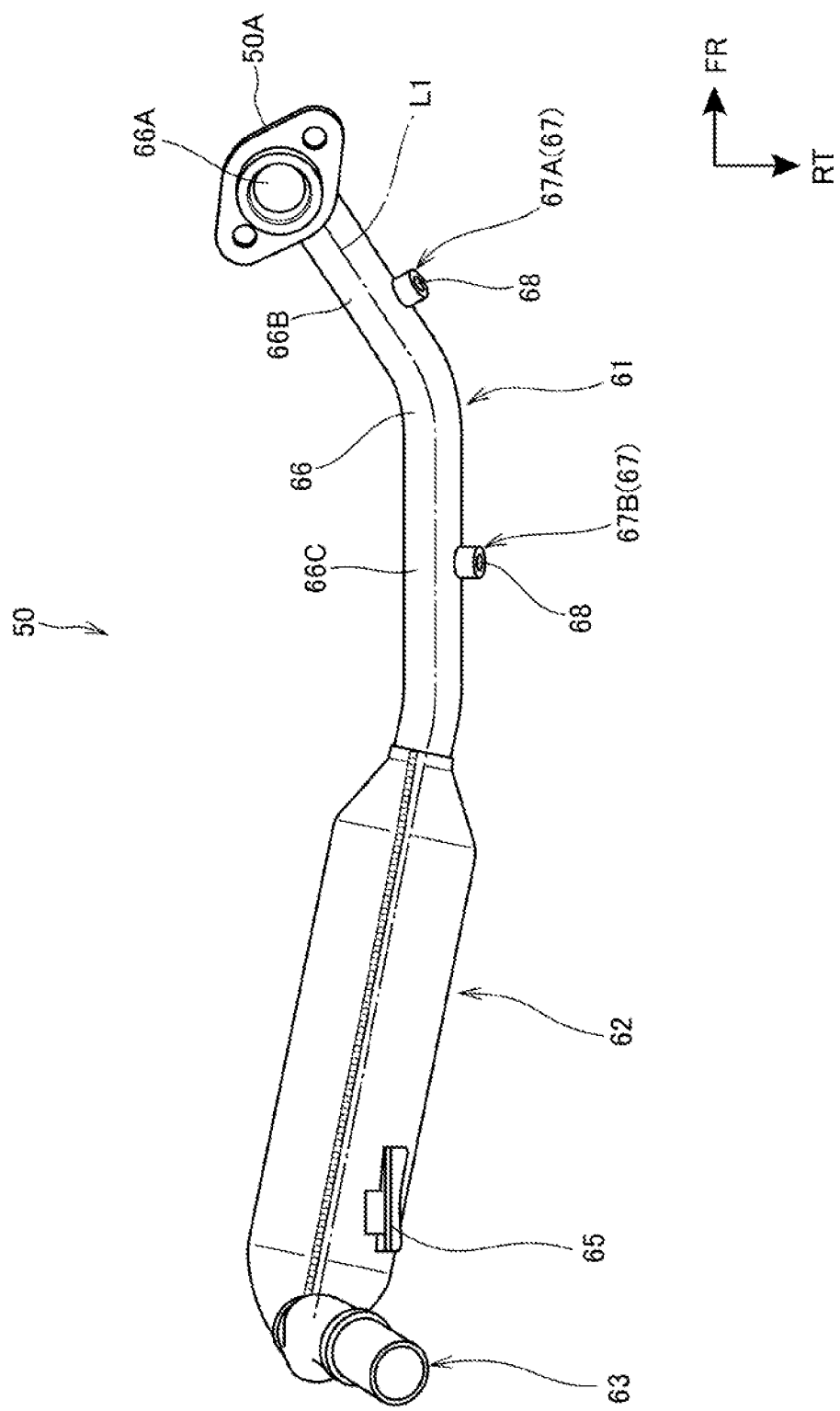
FIG. 4 is a view of the exhaust pipe in FIG. 3 as seen from above.

FIG. 3 is a view with the exhaust pipe cover 71 removed from FIG. 2. FIG. 4 is a view of the exhaust pipe 50 in FIG. 3 as seen from above.

As shown in FIG. 3, the exhaust pipe 50 broadly includes: a first exhaust pipe 61 extending downward from the exhaust port 32D of the engine 30 and then bends and extends rearward; a second exhaust pipe 62 linked to the downstream end of this first exhaust pipe 61, extending straightly rearward, and formed larger in diameter than the first exhaust pipe 61; and a third exhaust pipe 63 linked to the downstream end of the second exhaust pipe 62, extending upward, and formed smaller in diameter than the second exhaust pipe 62 (the same diameter as the first exhaust pipe 61).

These first to third exhaust pipes 61 to 63 are formed as separate bodies. The first and third exhaust pipes 61 and 63 are formed by bending metal pipes. The second exhaust pipe 62 having the largest diameter is formed as left and right splittable structures that are bonded to each other by welding, and houses therein a catalyst, which is not shown, and functions as a catalytic converter. With this catalyst, hydrocarbon, carbon monoxide, nitrogen oxide, and the like in exhaust gas can be removed by oxidation reduction reactions.

The first to third exhaust pipes 61 to 63 are bonded to and integrated with each other by welding or the like and then joined to the engine 30 with bolts. Meanwhile, the second exhaust pipe 62 is provided with a stay 65 on its upper surface, and is fastened to the center frames 15 with a bolt through this stay 65, thereby allowing exhaust pipe 50 to be supported also on the vehicle body frame F.

In this configuration, since the second exhaust pipe 62, which is a relatively heavy catalytic converter, is disposed at the rear of the engine 30 and supported on the center frame 15, it is possible to easily secure the support strength of the catalytic converter. Moreover, since the catalytic converter is disposed close to the rider as compared to a case where the catalytic converter is disposed close to the front of the engine 30, it is easy to optimize the center of gravity.

Moreover, as shown in FIG. 2, in this configuration, the exhaust port 32D of the engine 30 and the second exhaust pipe 62 are distant from each other, and the first exhaust pipe 61 therebetween is covered over almost the entire length thereof with the exhaust pipe cover 71. This exhaust pipe cover 71 can suppress decrease in the temperature of exhaust gas reaching the catalyst and thus facilitate faster activation of the catalyst.

Next, the first exhaust pipe 61 and the exhaust pipe cover 71 will be described.

As shown in FIG. 4, the first exhaust pipe 61 includes: an exhaust pipe body 66 formed of a single metal pipe; the metal flange portion 50A bonded to the upstream end of the exhaust pipe body 66; and metal boss portions 67 each bonded to the exhaust pipe body 66 and having an internal thread for attaching the exhaust pipe cover 71.

As shown in FIGS. 3 and 4, the exhaust pipe body 66 includes a bent pipe portion 66A, an upstream pipe portion 66B, and a downstream pipe portion 66C as an integral body. The bent pipe portion 66A extends downward from the exhaust port of the engine 30. The upstream pipe portion 66B bends from the lower end of the bent pipe portion 66A and extends straightly while inclining downwardly rearward and outward in the vehicle width direction (rightward (see FIG. 4)). The downstream pipe portion 66C bends from the rear end of the upstream pipe portion 66B and extends straightly toward the rear at a different angle than the upstream pipe portion 66B.

Moreover, the rear end of the downstream pipe portion 66C bends inward in the vehicle width direction (leftward) and connects to the second exhaust pipe 62. Moreover, the boss portions 67 are bonded by welding respectively to the right surfaces of the upstream pipe portion 66B and the downstream pipe portion 66C which differ from each other in inclination angle.

In FIG. 4, reference numeral L1 denotes an axial line passing the center of the exhaust pipe 50. Each boss portion 67 has the same shape. They are in the shape of a perfectly circular cylinder projecting perpendicularly to the axial line L1 in a plan view, and have an internal thread 68 in which to fasten a fastening bolt (fastening member) 72 shown in FIG. 2 in the inner periphery thereof. Moreover, each boss portion 67 is provided in such a way as to face the right side while tilting upward at a predetermined angle (several to over ten degrees), instead of facing completely horizontally.

In the following, for a simple explanation, the boss portion 67 provided to the upstream pipe portion 66B is expressed as the boss portion 67A, and the boss portion 67 provided to the downstream pipe portion 66C is expressed as the boss portion 67B, when description is to be given by distinguishing the boss portions 67 from one another.

As shown in FIG. 4, since projecting perpendicularly to the axial line L1, the boss portion 67A is a boss portion projecting toward a front right side, and the boss portion 67B is a boss portion projecting toward the right side. Moreover, the boss portion 67A is provided at a middle position on the upstream pipe portion 66B (a middle position along the axial line L1), and the boss portion 67B is provided at a middle position on the downstream pipe portion 66C (a middle position along the axial line L1).

Figure 5A:
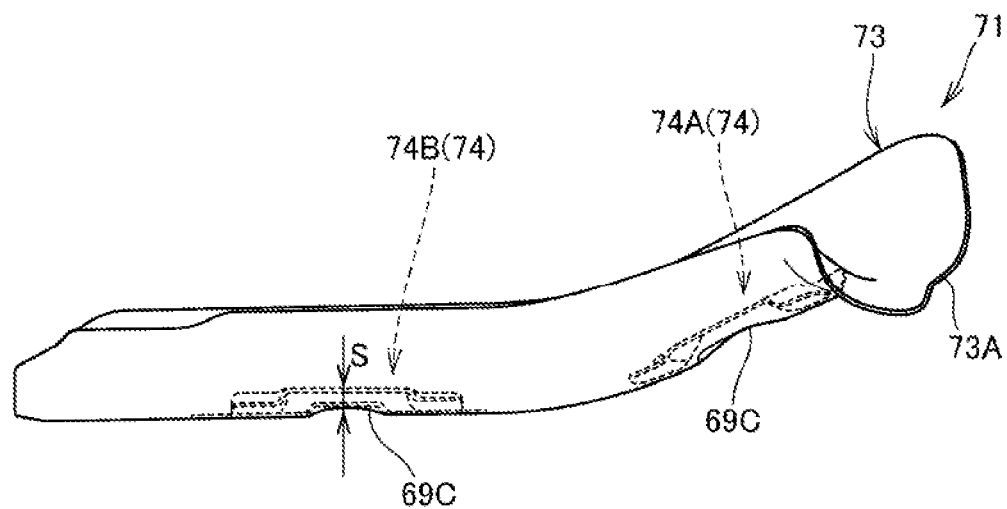
FIG. 5(A) is a view of the exhaust pipe cover as seen from above.
Figure 5B:
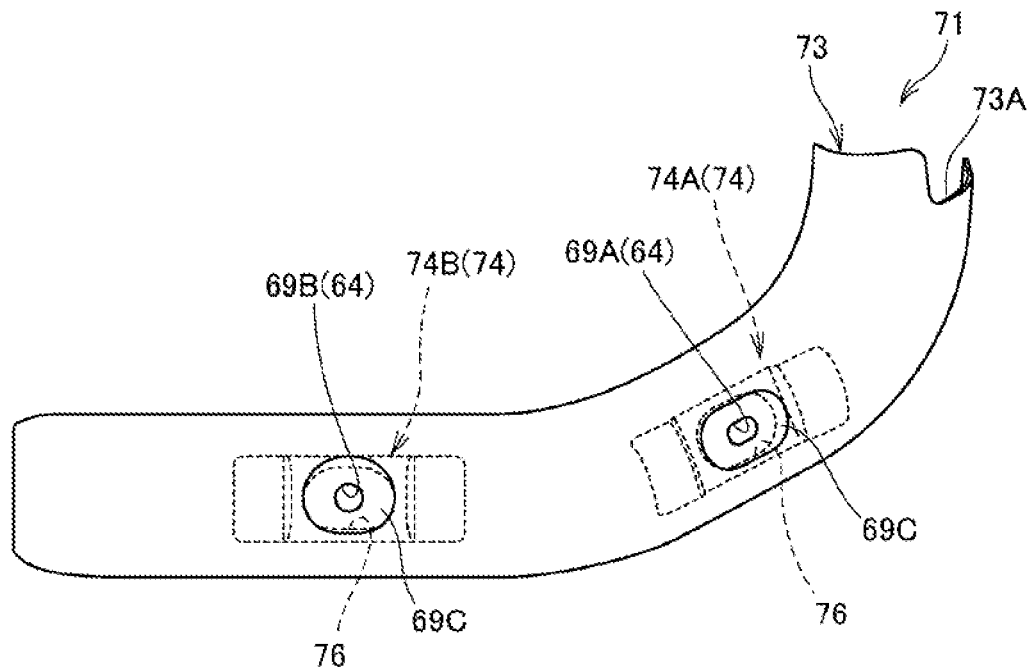
FIG. 5(B) is a view of the exhaust pipe cover as seen from the right.

FIG. 5(A) is a view of the exhaust pipe cover 71 as seen from above, and FIG. 5(B) is a view of the exhaust pipe cover 71 as seen from the right.

As shown in FIGS. 5(A) and 5(B), the exhaust pipe cover 71 has a substantially semicircular cross section that covers the right surface of the first exhaust pipe 61, and includes: a metal cover body 73 extending along the first exhaust pipe 61; and metal plate-shaped pieces 74 separated from each other and attached to the inside of the cover body 73.

The front end of the cover body 73 is formed in a shape having a notched portion 73A so as to leave a space for the head of the corresponding fastening bolt 55 as shown in FIG. 2 that is forwardly tilted. Moreover, attaching holes 69 in which to insert the fasting bolts 72 (see FIG. 2) are provided in the cover body 73 at positions corresponding to the boss portions 67A and 67B of the first exhaust pipe 61, respectively. The plate-shaped pieces 74 are attached inward of these attaching holes 69 in the vehicle width direction.

Meanwhile, substantially elliptical flat surface portions 69C which the seats of the fastening bolts 72 come into contact with are formed around the attaching holes 69.

In the following, the attaching hole 69 and the plate-shaped piece 74 provided at the position corresponding to the boss portion 67A are expressed as the attaching hole 69A and the plate-shaped piece 74A when appropriate, and the attaching hole 69 and the plate-shaped piece 74 provided at the position corresponding to the boss portion 67B are expressed as the attaching hole 69B and the plate-shaped piece 74B when appropriate.

The plate-shaped pieces 74A and 74B are each formed by boring a hooking hole 76 (FIG. 5(B)) in a substantially rectangular plate member, the hooking hole 76 serving as a hooking portion on which to hook the boss portion 67A or 67B.

Figure 6:
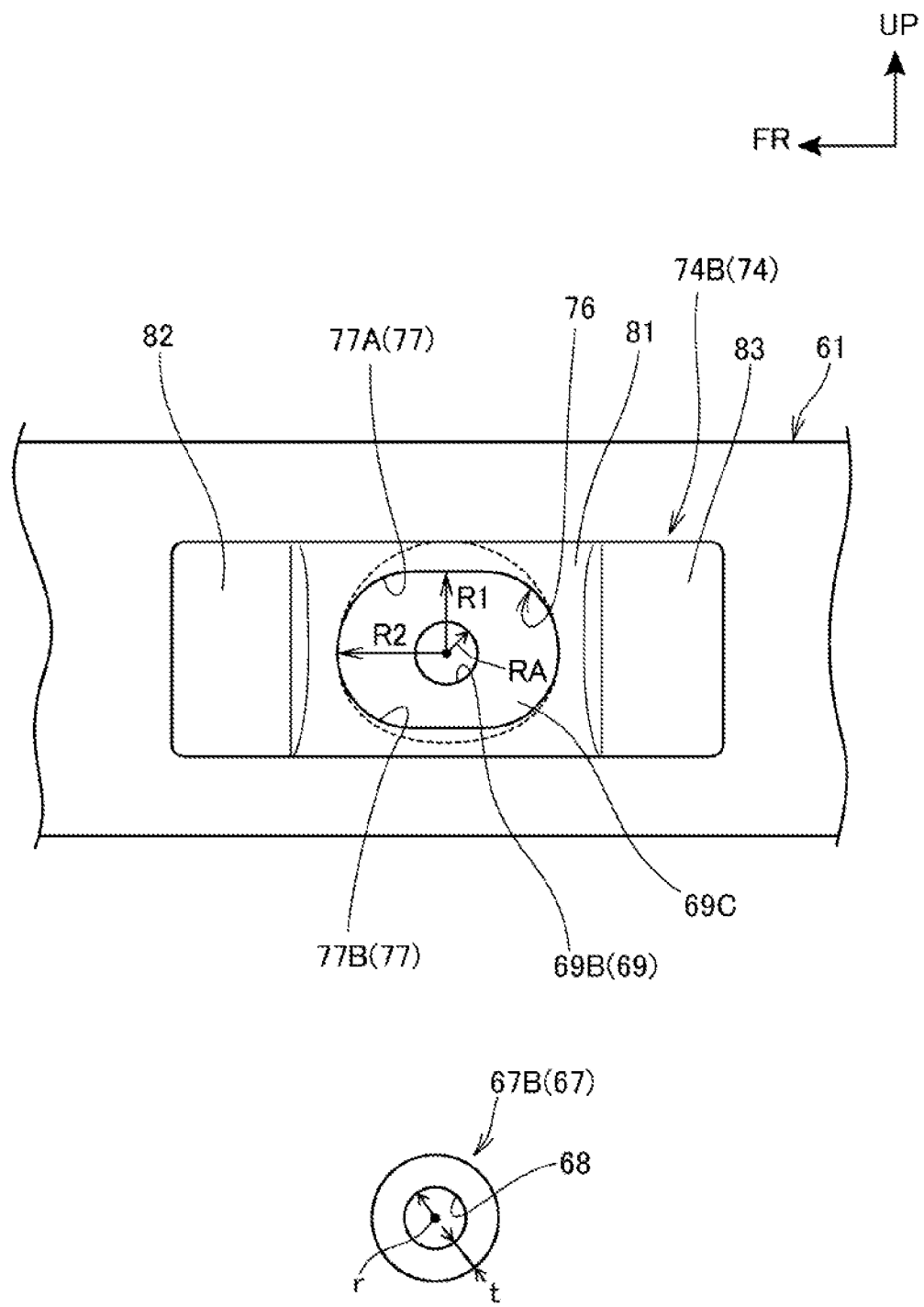
FIG. 6 is a view showing a plate-shaped piece and a boss portion as seen from the inside of a first exhaust pipe in the vehicle width direction.

FIG. 6 is a view showing the plate-shaped piece 74B and the boss portion 67B as seen from the inside of the first exhaust pipe 61 (upstream pipe portion 66B) in the vehicle width direction. Note that the plate-shaped pieces 74A and 74B of this embodiment are the same component, and the boss portions 67A and 67B are the same component as well. Hence, the plate-Shaped piece 74B and the boss portion 67B will be described representatively.

The plate-shaped piece 74B includes a flat plate portion 81 and a pair of front and rear bonding plate portions 82 and 83 as an integral body. The flat plate portion 81 has the hooking hole 76. The bonding plate portions 82 and 83 are bent toward the first exhaust pipe 61 at the front and rear ends of the flat plate portion 81 and bonded to the first exhaust pipe 61 by welding or the like. Accordingly, the hooking hole 76 is disposed with a gap S (see FIG. 5(A)) between itself and the flat surface portion 69C. Moreover, the hooking hole 76 is formed at a position coaxial with the attaching hole 69A provided to the exhaust pipe cover 71.

The hooking hole 76 is formed as a through-hole larger than the outer shape of the boss portion 67B, and is a loose penetration hole allowing the boss portion 67B to loosely penetrate therethrough with a play in the circumferential direction of the hooking hole 76 which includes the front-rear direction and the up-down direction of the vehicle body. For this reason, the boss portion 67B can be easily hooked on the hooking hole 76. Moreover, the exhaust pipe cover 71 in this hooked state can be moved in the front-rear direction, the up-down direction, and the like of the vehicle body within the range of the play.

Further, the hooking hole 76 is formed as a hole which allows the boss portion 67A or 67B to be viewed through the attaching hole 69B in a state where the boss portion 67B is hooked.

More specifically the hooking hole 76 is formed as a substantially elliptical hole elongated along the axial line L1 of the exhaust pipe 50, and its shorter axis radius R1 and longer axis radius R2 satisfy the following conditions.

$$RA < R1 \text{ and } R2 < RA + 2(r+t) \quad \text{Formula (1)}$$

where the value RA is the radius of the attaching hole 69B, the value r is the radius of the internal thread 68 provided in the boss portion 67B, and the value t is the thickness of the boss portion 67B. In other words, the value 2(r+t) represents the diameter of the boss portion 67B.

By satisfying Formula (1) mentioned above, part of the boss portion 67B can be situated inside the attaching hole 69B even when the boss portion 67B is in contact with an inner periphery 77 of the hooking hole 76, and therefore the boss portion 67B can always be viewed through the attaching hole 69B from the outside of the exhaust pipe cover 71 in the vehicle width direction.

Further, in this configuration, the shorter axis radius R1 and the longer axis radius R2 are set to values smaller than the upper limit value (RA+2(r+t)) in Formula (1) mentioned above, so as to form a hole that allows the internal thread 68 of the boss portion 67B to be viewed through the attaching hole 69B. Accordingly, the internal thread 68 of the boss portion 67A or 67B can always be viewed through the attaching hole 69B from the outside of the exhaust pipe cover 71 in the vehicle width direction. The condition for this case is shown in Formula (2).

$$RA < R1 \text{ and } R2 < RA + 2r + t \quad \text{Formula (2)}.$$

In other words, by subtracting the thickness t of the boss portion 67B from the value (RA+2(r+t)) in Formula (1) mentioned above, it is possible to obtain the radii R1 and R2 that allow the internal thread 68 of the boss portion 67B to be viewed through the attaching hole 69B.

Meanwhile, the attaching hole 69B and the internal thread 68 of the boss portion 67B are formed such that the radius RA and the radius r are substantially the same. Hence, by assuming that value RA=value r. Formula (1) can be expressed as Formula (3) below, and Formula (2) can be expressed as Formula (4) below.

$$RA < R1 \text{ and } R2 < 3r + 2t \quad \text{Formula (3)}$$

$$RA < R1 \text{ and } R2 < 3r + t \quad \text{Formula (4)}.$$

In this configuration, with the radii R1 and R2 satisfying Formula (2) or (4) mentioned above, part of the internal thread 68 of the boss portion 67B is situated inside the attaching hole 69B, and the internal thread 68 is viewable through the attaching hole 69B from the outside of the exhaust pipe cover 71 in the vehicle width direction, even when the boss portion 67B is in contact with the inner periphery 77 of the hooking hole 76.

Figure 7:
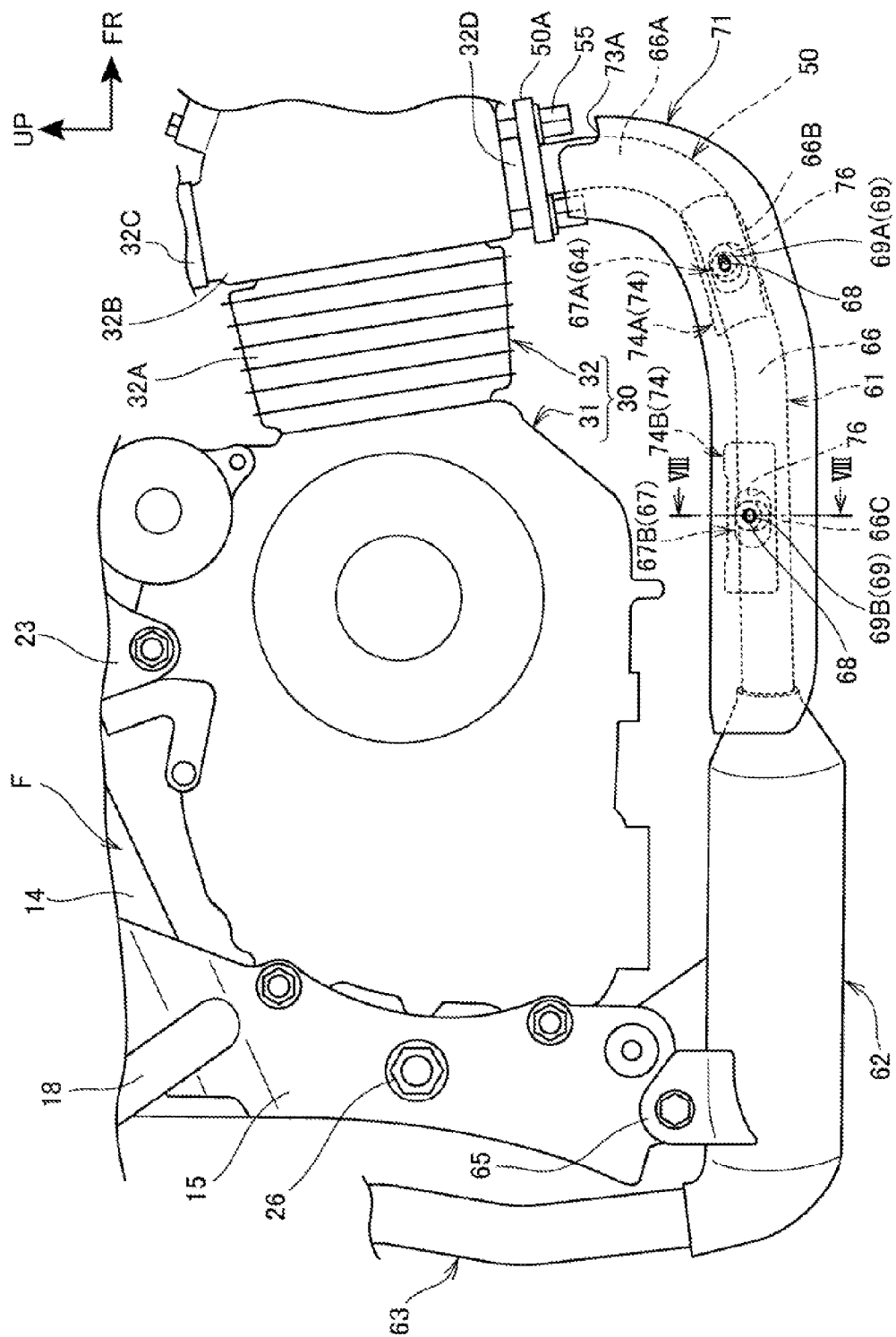
FIG. 7 is a view showing a state where hooking holes of the exhaust pipe cover are set on their respective boss portions.
Figure 8A:
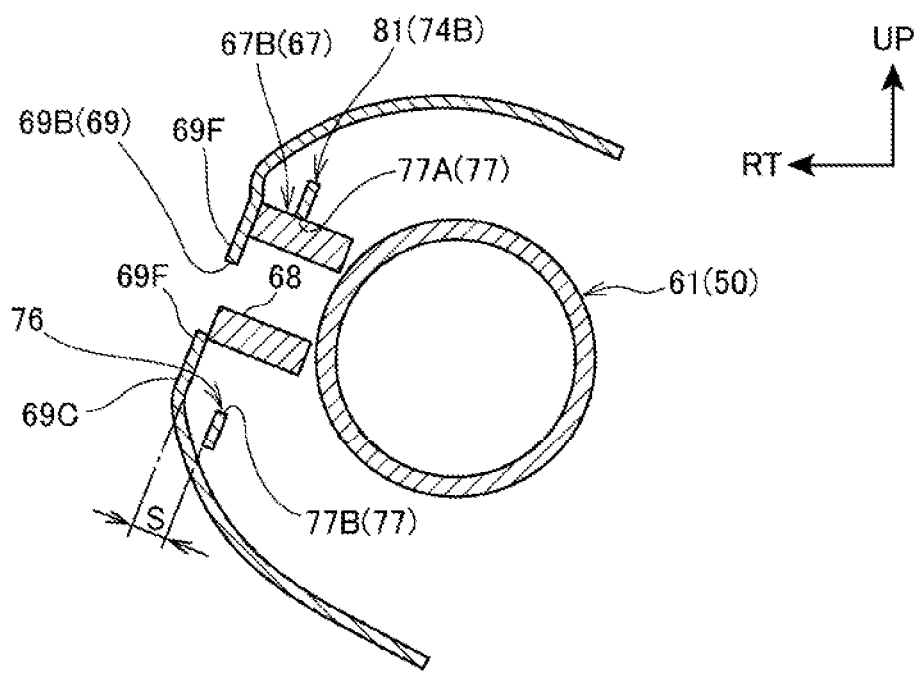
FIG. 8(A) is a view showing a cross section taken along line VIII-VIII in FIG. 7.

FIG. 7 shows a state where the hooking holes 76 of the exhaust pipe cover 71 are set on their respective boss portions 67A and 67B. FIG. 8(A) is a view showing a cross section taken along in FIG. 7.

As the hooking holes 76 of the exhaust pipe cover 71 are set on the boss portions 67A and 67B as shown in FIG. 7, an upper inner periphery 77A (see FIG. 6) of the hooking hole 76 provided in the plate-shaped piece 74B of the exhaust pipe cover 71 is mounted on the outer peripheral surface of the boss portion 67B as shown in FIG. 8(A). Thus, the exhaust pipe cover 71 is supported on the boss portion 67B, thereby allowing the exhaust pipe cover 71 to be semi-fixed to the first exhaust pipe 61 in the state shown in FIG. 7.

In this case, as shown in FIG. 8(A), upper and lower edge portions 69F sandwiching the attaching hole 69B of the exhaust pipe cover 71 and the like are in contact with the end surface of the corresponding boss portion 67. Thus, the exhaust pipe cover 71 is supported on the boss portion 67 at at least three points including the upper inner periphery 77A of the hooking hole 76, the upper and lower edge portions 69F of the attaching hole 69B, and the like. In this way, it is possible to prevent swing and the like of the exhaust pipe cover 71 and thus to appropriately semi-fix the exhaust pipe cover 71 to the first exhaust pipe 61.

Note that in the state of FIG. 7, the upper inner periphery 77A (not shown) of the hooking hole 76 provided in the other plate-shaped piece 74A of the exhaust pipe cover 71 is likewise mounted on the other boss portion 67A. Thus, the exhaust pipe cover 71 can be supported on the pair of front and rear boss portions 67A and 67B. Accordingly, it is possible to appropriately semi-fix the exhaust pipe cover 71 to the exhaust pipe 50.

Further, as shown in FIG. 8(A), in the semi-fixed state mentioned above, a lower opening portion of the internal thread 68 of the boss portion 67B is viewable through the corresponding attaching hole 69 of the exhaust pipe cover 71. Thus, when attaching the exhaust pipe cover 71, the assembler does not need to hold the exhaust pipe cover 71 to prevent it from falling from the exhaust pipe 50. Furthermore, since the internal thread 68 of the boss portion 67 can be seen in the semi-fixed state, the assembler can easily align the internal thread 68 and the attaching hole 69.

Figure 8B:
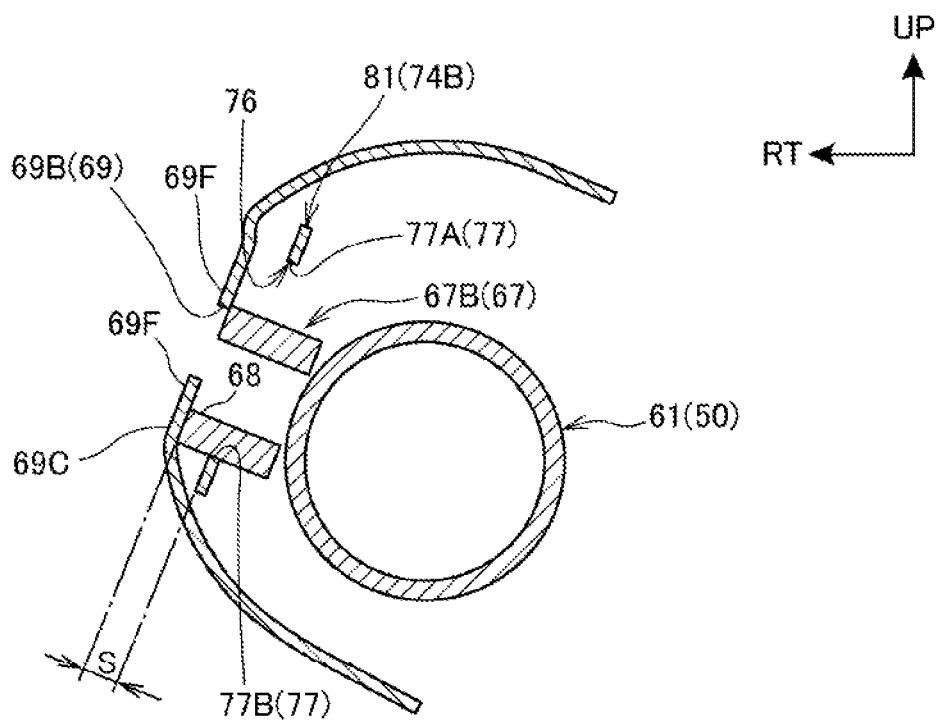
FIG. 8(B) is a view showing a state where the exhaust pipe cover is lifted upward.

Meanwhile, as shown in FIG. 8(B), as the exhaust pipe cover 71 is lifted upward from the semi-fixed state, a lower inner periphery 71B of each hooking hole 76 comes into contact with the outer peripheral surface of the corresponding boss portion 67, thus restricting further movement of the exhaust pipe cover 71.

In this case, an upper opening portion of the internal thread 68 of the boss portion 67 is viewable through the attaching hole 69 of the exhaust pipe cover 71. Thus, the exhaust pipe cover 71 is prevented from moving to positions where the internal thread 68 is not viewable through the attaching hole 69 of the exhaust pipe cover 71.

Moreover, as shown in FIG. 8(B), at also a position where the exhaust pipe cover 71 is lifted to the highest point, the upper and lower edge portions 69F sandwiching the attaching hole 69B of the exhaust pipe cover 71 are held in contact with the end surface of the corresponding boss portion 67. Thus, swing and the like of the exhaust pipe cover 71 do not occur. This also allows the assembler to easily align the attaching hole 69B of the exhaust pipe cover 71 and its internal thread 68.

FIGS. 8(A) and 8(B) have shown a specific example where the exhaust pipe cover 71 is moved vertically while the hooking holes 76 of the exhaust pipe cover 71 are hooked on the boss portions 67. However, in this embodiment, like the shorter axis radius R1, the longer axis radius R2 (see FIG. 6) also allows each hooking hole 76 to be formed as a hole that makes the internal thread 68 of the corresponding boss portion 67 viewable. Thus, as long as the hooking hole 76 is hooked on the boss portion 67, the internal thread 68 of the boss portion 67 is always viewable through the attaching hole 69 of the exhaust pipe cover 71 even when the exhaust pipe cover 71 is moved toward the front or rear (in the front-rear direction of the vehicle body).

Thus, the assembler can look at the internal threads 68 and move the exhaust pipe cover 71 in the front-rear or up-down direction to the appropriate position. Accordingly, the exhaust pipe cover 71 can be easily moved to the appropriate position and fastened with the fastening bolts 72.

For this reason, the attachment of the exhaust pipe cover 71 can be easily done even in the case of attaching the exhaust pipe cover 71 to the exhaust pipe 50 after attaching the exhaust pipe 50 to the engine 30.

Moreover, as shown in FIGS. 6 and 7, each hooking hole 76 of this configuration is formed as a substantially elliptical loose penetration hole elongated in the front-rear direction of the vehicle body. Thus, the play for the boss portions 67A and 67B is larger in the front-rear direction than in the up-down direction. This makes it possible for the exhaust pipe cover 71 to secure a large amount of movement in the direction of the axial line L1 of the exhaust pipe 50 while the boss portions 67A and 67B are hooked on the hooking holes 76.

Furthermore, as shown in FIG. 6, the upper inner periphery 77A of each hooking hole 76 is formed in an arch shape bulging upward. Thus, the further the position of the hooking hole's contact with the boss portion 67A or 67B is moved in the front-rear direction from the position at which the attaching hole 69 of the exhaust pipe cover 71 and the internal thread 68 coincide with each other (referred to as the "coinciding position"), the smaller the play in the up-down direction becomes, thereby making it possible to narrow the moving range of the exhaust pipe cover 71 in the up-down direction.

In other words, the upper inner periphery 77A functions as an arch-shaped guide that narrows the moving range of the exhaust pipe cover 71 in the up-down direction as the guide is moved from the coinciding position in the front-rear direction. This makes it possible to further improve the positioning work while securing the moving range of the exhaust pipe cover 71 in the front-rear direction.

Moreover, as shown in FIG. 6, the lower inner periphery 77B of each hooking hole 76 is formed in an arch shape bulging downward. Thus, as the lower inner periphery 77B is moved from the coinciding position in the front-rear direction, the moving range of the exhaust pipe cover 71 in the up-down direction narrows.

In other words, the lower inner periphery 77B likewise functions as an arch-shaped guide that narrows the moving range of the exhaust pipe cover 71 in the up-down direction as the guide gets away from the coinciding position in the front-rear direction. This makes it possible to further improve the positioning work.

Further, in this configuration, the exhaust pipe 50 includes the upstream pipe portion 66B located on an upstream side and the downstream pipe portion 66C located downstream of the upstream pipe portion 66B and extending at a different angle than the upstream pipe portion 66B. The upstream pipe portion 66B and the downstream pipe portion 66C are provided with the boss portions 67A and 67B, respectively, and the exhaust pipe cover 71 is provided with the hooking holes 76 and the attaching holes 69A and 69B corresponding to the boss portions 67A and 67B.

For this reason, the relatively long exhaust pipe cover 71 extending a good amount of length along the exhaust pipe 50 can be fastened with bolts at different spots on the exhaust pipe 50 at different angles. Generally, a configuration that involves fastening, an exhaust pipe cover with bolts at different spots on the exhaust pipe at different angles provides an advantage of increasing the support strength of the exhaust pipe cover, but also causes a disadvantage of making the positioning of the exhaust pipe cover difficult.

On the other hand, in this configuration, the positioning of the exhaust pipe cover 71 is easy as described above. Thus, the above disadvantage can be solved. That is, this configuration can satisfy both easy attachment of the exhaust pipe cover 71 and the support strength thereof.

As described above, according to this embodiment, the exhaust pipe 50 is provided on its side surface with the boss portions 67 having the internal threads 68 through which to fasten the exhaust pipe cover 71. The exhaust pipe cover 71 is integrally provided on its inner side with the hooking holes (hooking portions) 76 which can be hooked on the boss portions 67 with play. In the state where the hooking holes 76 are hooked on the boss portions 67, part of the boss portions 67 is viewable through the attaching holes 69 of the exhaust pipe cover 71. Thus, even in the case of attaching the exhaust pipe cover 71 to the exhaust pipe 50 attached to the engine 30, the assembler can always visually recognize the positions of the boss portions 67 through the attaching holes 69 of the exhaust pipe cover 71. Accordingly, the exhaust pipe cover 71 can be positioned and attached easily.

Moreover, in this configuration, when the hooking holes 76 are hooked on the boss portions 67, part of the internal threads 68 provided in the boss portions 67 is viewable through the attaching holes 69 of the exhaust pipe cover 71. Thus, the assembler can always visually recognize the positions of the internal threads 68 through the attaching holes 69 of the exhaust pipe cover 71. Accordingly, the exhaust pipe cover 71 can be positioned and attached more easily.

Moreover, as shown in FIG. 7, the hooking holes 76 are hooked on the boss portions 67 with play. Accordingly the hooking holes 76 can be easily hooked on the boss portions 67, and the position of the exhaust pipe cover 71 in the hooked state can be easily adjusted.

Moreover, as shown in FIG. 3, the boss portions 67 are each provided in such a way as to tilt upward at a predetermined angle instead of facing horizontally. Thus, the hooking holes 76 are less likely to be unhooked from the boss portions 67. Accordingly, the hooked state of the exhaust pipe cover 71 can be easily maintained.

Further, the upper inner periphery 77A of each hooking hole 76 functions has an upwardly bulging arch-Shaped guide which comes into contact with the corresponding boss portion 67 to restrict the range of movement of the exhaust pipe cover 71. Thus, it is possible to narrow the moving range of the exhaust pipe cover 71 in the up-down direction while securing the moving range thereof in the front-rear direction. Accordingly the positioning work can further be improved.

Furthermore, the hooking holes 76 are formed as substantially elliptical loose penetration holes allowing the boss portions 67 to loosely penetrate therethrough. Thus, it is possible, with a simple shape, to secure a wide moving range for the exhaust pipe cover 71 in the direction of the longer axis of the loose penetration hole and narrow the moving range in the direction of the shorter axis and thereby achieve easy positional adjustment.

Moreover, in this configuration, the plate-shaped pieces 74 are joined to the exhaust pipe cover 71, and the hooking holes 76 are formed in these plate-shaped pieces 74. Accordingly, the rigidity of the exhaust pipe cover 71 can be increased by the plate-shaped pieces 74.

In addition, the hooking holes 76 in the plate-shaped pieces 74 are disposed at positions separated from the exhaust pipe cover 71. Thus, the hooking holes 76 can be hooked on the boss portions 67 to a certain depth. Accordingly, the hooking holes 76 can be hooked easily.

Moreover, the exhaust pipe cover 71 extends to the vicinity of the exhaust port 32D of the engine 30, and the exhaust pipe 50 includes a catalyst at a position downstream of the exhaust pipe cover 71. Thus, the exhaust pipe cover 71 can suppress decrease in the temperature of exhaust gas reaching the catalyst and thus facilitate faster activation of the catalyst.

Further, in this configuration, the exhaust pipe 50 includes the upstream pipe portion 66B located on an upstream side and the downstream pipe portion 66C located downstream of the upstream pipe portion 66B and extending at a different angle than the upstream pipe portion 66B. The upstream pipe portion 66B and the downstream pipe portion 66C are provided with the boss portions 67, respectively, and the exhaust pipe cover 71 is provided with the hooking holes 76 and the attaching holes 69 corresponding to the boss portions 67. Thus, the exhaust pipe cover 71 disposed over the upstream pipe portion 66B and the downstream pipe portion 66C can be positioned easily and also fastened at different spots on the exhaust pipe 50 at different angles. Accordingly, it is possible to satisfy both easy attachment of the exhaust pipe cover 71 and the support strength thereof.

<Cover Structure for Exhaust Muffler>

Subsequently, a cover structure for the exhaust muffler 51 of this motorcycle 1 will be described.

Figure 9:
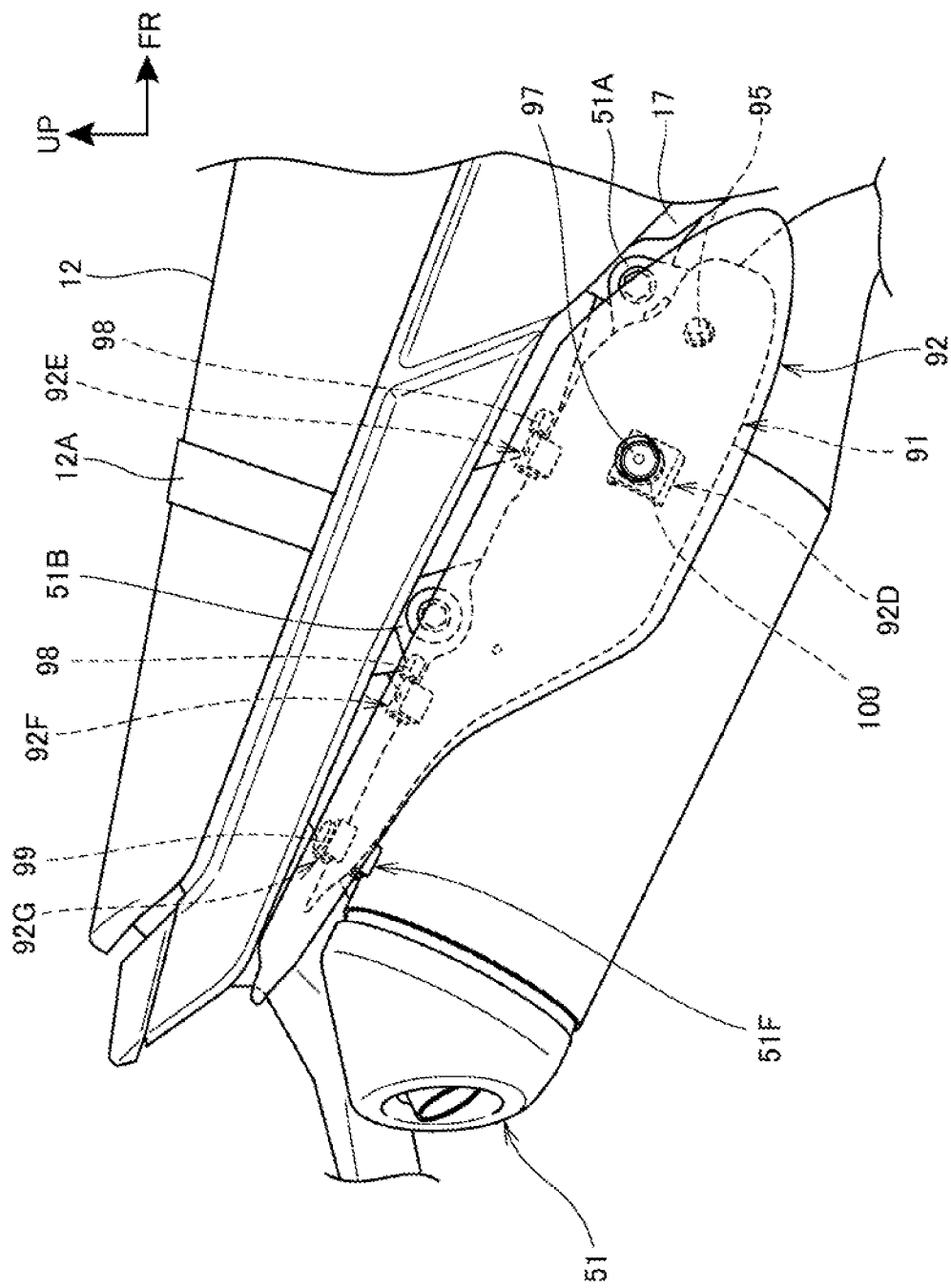
FIG. 9 is a view of an exhaust muffler together with its peripheral configuration as seen from the right.

FIG. 9 is a view of the exhaust muffler 51 together with its peripheral configuration as seen from the right.

This exhaust muffler 51 is fastened with bolts to the seat frame 17 through a pair of front and rear stays 51A and 51B. Thus, the exhaust muffler 51 is arranged at a position near the lower side of the seat frame 17 along the seat frame 17.

A heat guard 91 and a muffler cover 92 are attached to this exhaust muffler 51. The heat guard 91 is a metal plate-shaped member disposed between the exhaust muffler 51 and the muffler cover 92 to suppress increase in the temperature of the muffler cover 92 due to heat from the exhaust muffler 51 and is also called a heat shield plate.

The muffler cover 92 is a synthetic-resin plate-shaped member that covers the upper to right side of the exhaust muffler 51 and has a larger outer shape than the heat guard 91.

Figure 10:
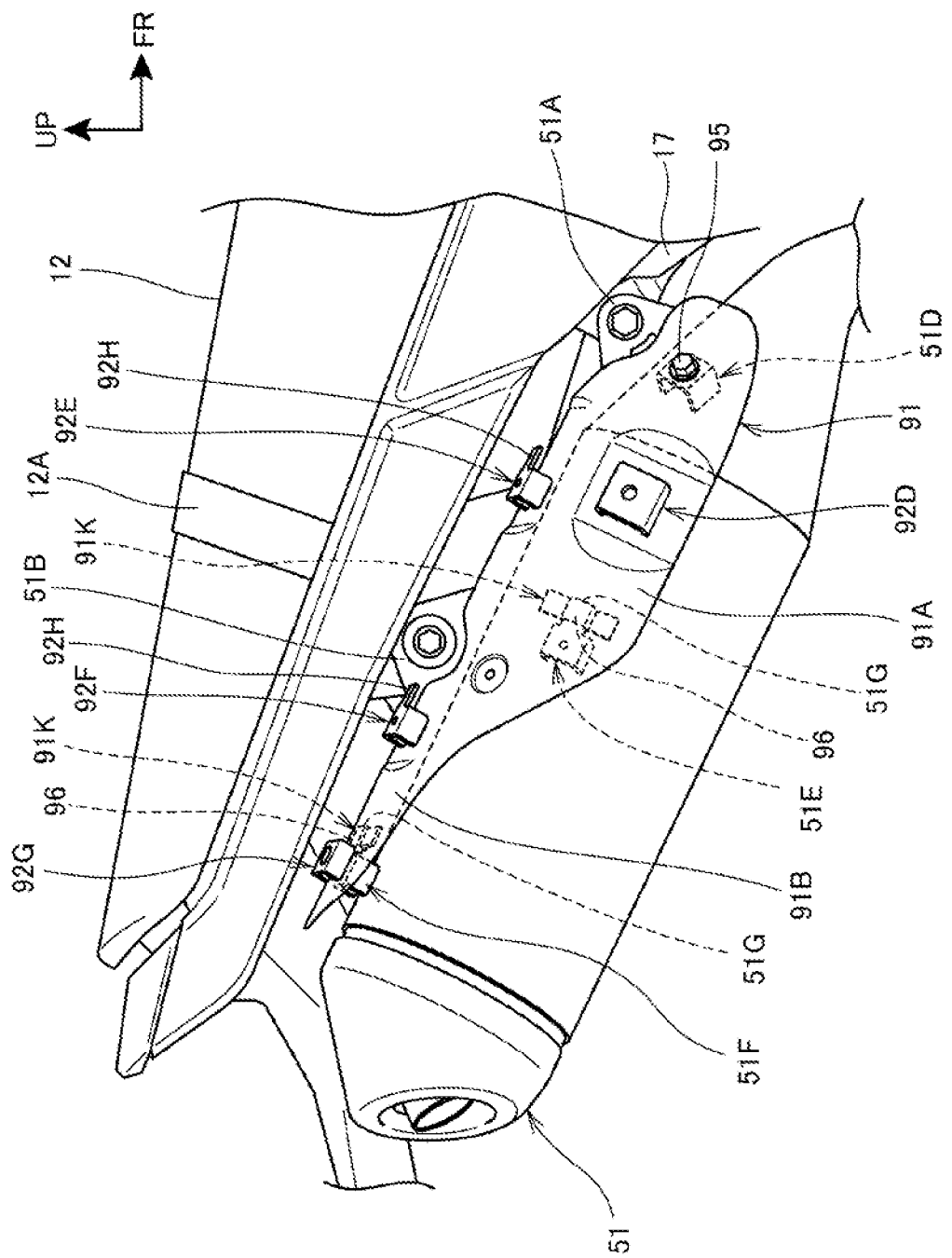
FIG. 10 is a view showing a state where a heat guard is attached to the exhaust muffler.

FIG. 10 is a view showing a state where the e heat guard 91 is attached to the exhaust muffler 51.

The heat guard 91 is formed such that its outer shape is substantially the same as the muffler cover 92 but slightly smaller than the muffler cover 92, and covers a front portion to a rear portion of the exhaust muffler 51 from upper and lateral sides of the exhaust muffler 51. A front half 91A of this heat guard 91 is formed as a wide portion that covers a wider area of the exhaust muffler 51 than a rear half 91B of the heat guard. 91 does.

Multiple (three in this configuration) heat guard fixing portions 51D, 51E, and 51F are provided on the exhaust muffler 51 in a separated manner. The heat guard fixing portion 51D is formed as an internal thread member for fastening the heat guard 91 with a fastening bolt (fastening member) 95.

Each of the other heat guard fixing portions 51E and 51F has a projecting portion 51G projecting toward the front of the vehicle body and is formed to have an inserting configuration that allows the projecting portion 51G to be inserted in an engaged portion 91K provided on the back surface of the heat guard 91.

Each projecting portion 51G has a tubular rubber member 96 mounted thereon and is, in that state, inserted in and engaged with the engaged portion 91G on the heat guard 91. Moreover, the heat guard fixing portion 51D has an unillustrated annular rubber member mounted thereon at a portion that comes in contact with the back surface of the heat guard 91. Thus, the rubber members 96 are interposed between the exhaust muffler 51 and the heat guard 91, thereby allowing the heat guard 91 to be rubber mounted at three points.

As shown in FIG. 10, the heat guard fixing portions 51E and 51F are disposed separately on the front half 91A and the rear half 91B of the heat guard 91. By sliding the heat guard 91 rearward relative to the exhaust muffler 51, the heat guard 91 can be easily fixed to the heat guard fixing portions 51E and 51F. In this case, the heat guard 91 is maintained in a state of being fixed to the heat guard fixing portions 51E and 51F by the elastic force of the rubber members 96. Thus, the heat guard 91 can be semi-fixed.

The front half 91A of the heat guard 91 in this semi-fixed state is then fastened to the heat guard fixing portion 51D with the fastening bolt 95. This completes the attachment of the heat guard 91. Rubber mounting the heat guard 91 makes heat from the exhaust muffler 51 less likely to be transmitted to the heat guard 91, and also makes it possible to suppress vibration of the heat guard 91 due to vibration of the vehicle body.

Multiple (four in this configuration) muffler cover fixing portions 92D, 92E, 92F, and 92G are provided on the outer surface of this heat guard 91 in a separated manner. One muffler cover fixing portion 92D is formed as an internal thread member for fastening the muffler cover 92 with a fastening bolt (fastening member) 97 shown in FIG. 9.

Figure 11:
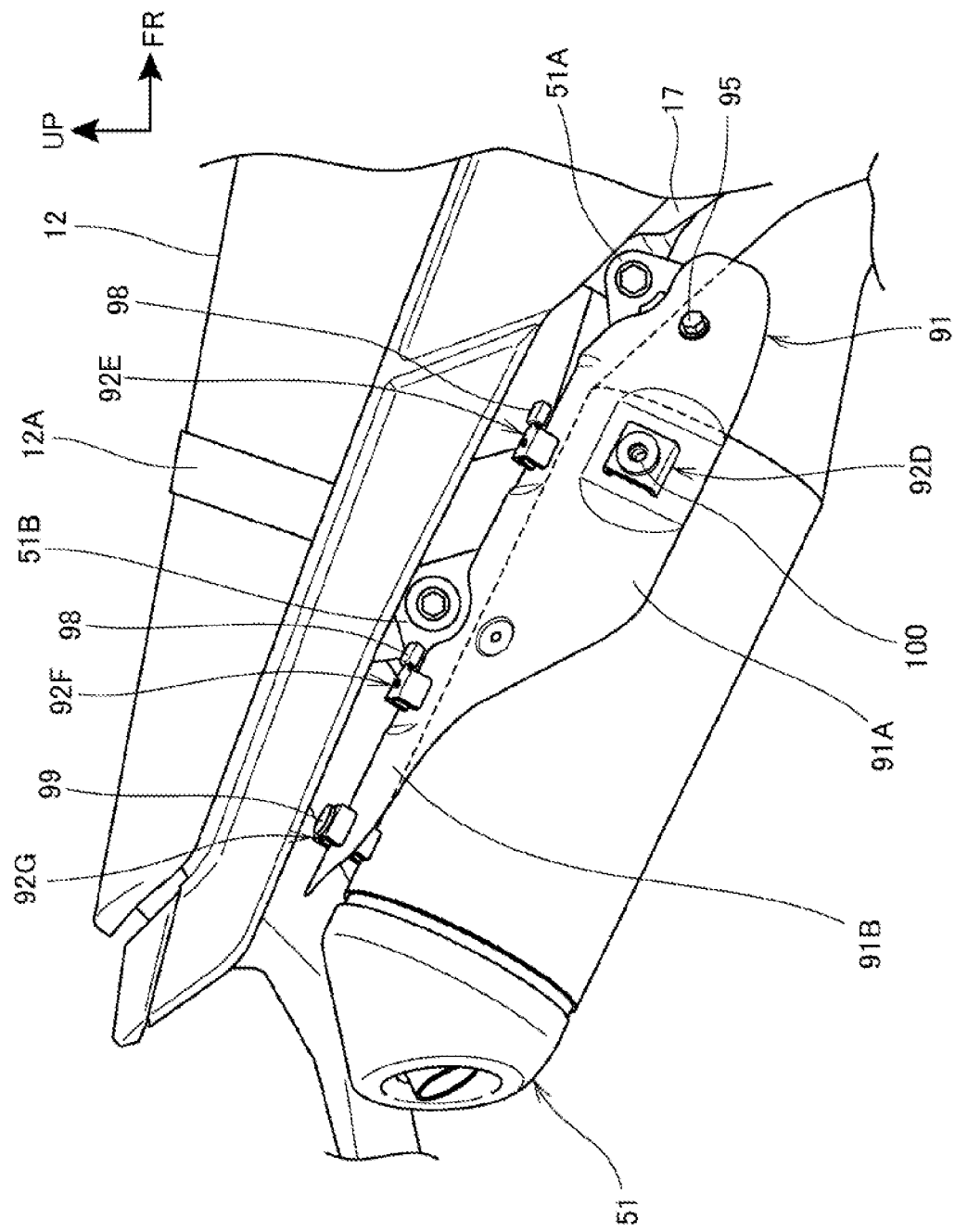
FIG. 11 is a view showing a state where rubber members are mounted on the heat guard in FIG. 10.

Each of the muffler cover fixing portions 92E and 92F has a projecting portion 92H projecting toward the front of the vehicle body, and is formed to have an inserting configuration that allows the projecting portion 52H to be inserted in an engaged portion (not shown) provided on the back surface of the muffler cover 92. As shown in FIG. 11, each projecting portion 92H also has a tubular rubber member 98 mounted thereon as in the case of each projecting portion 516 provided on the exhaust muffler 51.

As shown in FIG. 10, the muffler cover fixing portion 92G projects outward (toward the muffler cover 92) from the rear half 91B of the heat guard 91 and forms a surface to be in contact with the muffler cover 92. This muffler cover fixing portion 92G functions as a stopper that comes into contact with the back surface of the muffler cover 92 to prevent the muffler cover 92 from touching the heat guard 91. As shown in FIG. 11, a disk-shaped rubber member 99 and an annular rubber member 100 are mounted respectively on the surfaces of the muffler cover fixing portion 92G and the muffler cover fixing portion 92D to be in contact with the muffler cover 92.

After the rubber members 98 to 100 are mounted as shown in FIG. 11, the projecting portions 92H are brought into engagement with their respective engaged portions (not shown) provided on the back surface of the muffler cover 92, thereby fixing the muffler cover 92 as shown in FIG. 9. In this case, the rubber members 98 are interposed between the muffler cover fixing portions 92E and 92F on the heat guard 91 and the engaged portions on the muffler cover 92, and the rubber members 99 and 100 are interposed between the muffler cover fixing portion 92G and muffler cover fixing portion 92D and the muffler cover 92. Accordingly, the muffler cover 92 is rubber mounted at four points.

According to this configuration, by sliding the muffler cover 92 rearward relative to the heat guard 91, the muffler cover 92 can be easily fixed to the muffler cover fixing portions 92E and 92F. Moreover, the muffler cover 92 can be semi-fixed by the elastic, force of the rubber members 98.

Further, the muffler cover 92 in this semi-fixed state is fastened to the muffler cover fixing portion 92D with the fastening bolt 97 (see FIG. 9). This completes the attachment of the muffler cover 92. Rubber mounting the muffler cover 92 makes heat from the heat guard 91 less likely to be transmitted to the muffler cover 92, and also makes it possible to suppress vibration of the muffler cover 92 due to vibration of the vehicle body.

As described above, in this configuration, the heat guard 91 is rubber mounted on the exhaust muffler 51, and the muffler cover 92 is rubber mounted on the heat guard 91. Accordingly, it is possible to effectively suppress increase in the temperature of the muffler cover 92 due to exhaust heat.

The embodiment described above merely shows one embodiment of the present invention, and any modifications and applications are possible without departing from the gist of the present invention. For example, although the above embodiment has described the case where the hooking holes 76 are formed as holes that allow part of the internal threads 68, provided in the boss portions 67, to be viewed through the attaching holes 69 of the exhaust pipe cover 71, the present invention is not limited to this case. The hooking holes 76 may be formed as holes that allow part of the boss portions 69 to be viewed through the attaching holes 69 of the exhaust pipe cover 71.

Moreover although the above embodiment has described the case where the hooking holes 76 are formed as holes on which to hook the boss portions 67 with play in front-rear direction and the up-down direction of the vehicle body, the hooking holes 76 only need to be holes on which to hook the boss portions 67 at least with play. The hooking holes 76 may be holes having play at least in one of the front-rear direction and the up-down direction of the vehicle body. Moreover, the shape of the hooking holes is not limited to the elliptical shape, and various shapes such as a perfectly circular shape and a polygonal shape may be employed instead.

Moreover, although the above embodiment has described the case where the present invention is applied as an exhaust pipe cover structure for the motorcycle 1 shown in FIG. 1, the present invention may be applied as an exhaust pipe cover structure for other motorcycles and saddle-ride type vehicles other than motorcycles. It should be noted that the saddle-ride type vehicles include vehicles which one drives by straddling the vehicle body in general and refer to vehicles including not only motorcycles (including motorized bicycles) but also three-wheeled vehicles and four-wheeled vehicles categorized as ATV (all terrain vehicles).

I claim:

1. An exhaust pipe cover structure for a saddle-ride type vehicle, comprising:
    an exhaust pipe; and
    an exhaust pipe cover which covers a lateral side of said exhaust pipe said and is fastened to said exhaust pipe, said exhaust pipe cover having an attaching hole formed therein,
    wherein a boss portion is provided on a lateral surface of said exhaust pipe, said boss portion having an internal thread through which said exhaust pipe cover is fastened to said exhaust pipe,
    wherein a hooking portion is integrally provided on an inner side of said exhaust pipe cover, said hooking portion including a hooking hole inwardly spaced from said attaching hole formed in said exhaust pipe cover, with as gap therebetween, said hooking hole being capable of being hooked on said boss portion,
    wherein, in a state where said hooking portion is hooked on said boss portion, part of said boss portion is viewable through said attaching hole formed in said exhaust pipe cover,
    wherein said boss portion is capable of penetrating said hooking hole but is not capable of penetrating said attaching hole,
    wherein said exhaust pipe cover includes a plate-shaped piece,
    wherein said hooking portion is provided in said plate-shaped piece,
    wherein said hooking hole is a substantially elliptical loose penetration hole which allows said boss portion to loosely penetrate therethrough, and
    wherein said hooking hole is elongated along an axial line of the exhaust pipe.

2. The exhaust pipe cover structure for a saddle-ride type vehicle according to claim 1, wherein said hooking portion is capable of being hooked on said boss portion with play.

3. The exhaust pipe cover structure for a saddle-ride type vehicle according to claim 1,
    wherein an upper inner periphery of said hooking hole forms an upwardly bulging arch-shaped guide, and
    wherein, in the state where said hooking portion is hooked on said boss portion, said upwardly bulging arch-shaped guide comes into contact with said boss portion to restrict a moving range of said exhaust pipe cover relative to said exhaust pipe.

4. The exhaust pipe cover structure for a saddle-ride type vehicle according to claim 2,
    wherein an upper inner periphery of said hooking hole forms an upwardly bulging arch-shaped guide, and
    wherein, in the state where said hooking portion is hooked on said boss portion, said upwardly bulging arch-shaped guide comes into contact with said boss portion to restrict a moving range of said exhaust pipe cover relative to said exhaust pipe.

5. The exhaust pipe cover structure for a saddle-ride type vehicle according to claim 3, wherein said hooking portion of said plate-shaped piece is disposed at a position separated from said exhaust pipe cover.

6. The exhaust pipe cover structure for a saddle-ride type vehicle according to claim 4, wherein said hooking portion of said plate-shaped piece is disposed at a position separated from said exhaust pipe cover.

7. The exhaust pipe cover structure for a saddle-ride type vehicle according to claim 5,
    wherein said exhaust pipe cover extends to a vicinity of an exhaust port of an engine of the saddle-ride type vehicle, and
    wherein said exhaust pipe includes a catalyst at a position downstream of said exhaust pipe cover.

8. The exhaust pipe cover structure for a saddle-ride type vehicle according to claim 6,
    wherein said exhaust pipe cover extends to a vicinity of an exhaust port of an engine of the saddle-ride type vehicle, and
    wherein said exhaust pipe includes a catalyst at a position downstream of said exhaust pipe cover.

9. The exhaust pipe cover structure for a saddle-ride type vehicle according to claim 7, wherein, in a state where said hooking portion is hooked on said boss portion, part of said internal thread provided in said boss portion is viewable through said attaching hole of said exhaust pipe cover.

10. The exhaust pipe cover structure for a saddle-ride type vehicle according to claim 8, wherein, in a state where said hooking portion is hooked on said boss portion, part of said internal thread provided in said boss portion is viewable through said attaching hole of said exhaust pipe cover.

11. The exhaust pipe cover structure for a saddle-ride type vehicle according to claim 1,
    wherein said hooking hole, said boss portion and said attaching hole satisfy the following formulas:

$$RA<R1<RA+2(r+t)$$

$$RA<R2<RA+2(r+t)$$

wherein R1 is a shorter radius of said elliptical hole,
wherein R2 is as longer radius of said elliptical hole,
wherein RA is the radius of said attaching hole,
wherein r is the radius of said internal thread provided in said boss portion, and
wherein t is a thickness of said boss portion.

12. The exhaust pipe cover structure for a saddle-ride type vehicle according to claim 11, wherein said hooking hole, said boss portion and said attaching hole satisfy the following formulas:

$$RA<R1<RA+2r+t$$

$$RA<R2<RA+2r+t.$$

13. The exhaust pipe cover structure for a saddle-ride type vehicle according to claim 11, wherein said hooking hole, said boss portion and said attaching hole satisfy the following formulas:

$$RA<R1<3r+2t$$

$$RA<R2<3r+2t$$

$$RA<R1<3r+t$$

$$RA<R2<3r+t.$$

14. The exhaust pipe cover structure for a saddle-ride type vehicle according to claim 1,
wherein the exhaust pipe includes an upstream pipe portion located on an upstream side of the exhaust pipe and an downstream pipe portion located downstream of the upstream pipe portion, the downstream pipe portion extending at a different angle titan the upstream pipe portion,
wherein the upstream pipe portion and the downstream pipe portion are each provided with at least one boss portion, and
wherein the exhaust pipe cover is fastened to the boss portions at different locations and different angles.

* * * * *